3,431,296
PROCESS FOR PREPARATION OF HIGH PURITY
TEREPHTHALIC ACID
Yataro Ichikawa and Nobuo Suzuki, Iwakuni-shi, Yamaguchi-ken, Japan, assignors to Teijin Limited, Osaka, Japan, a corporation of Japan
No Drawing. Filed Sept. 21, 1964, Ser. No. 398,034
Claims priority, application Japan, Oct. 10, 1963, 38/52,780; July 23, 1964, 39/42,156; Sept. 8, 1964, 39/51,285
U.S. Cl. 260—525    7 Claims
Int. Cl. C07c 51/42

ABSTRACT OF THE DISCLOSURE

A process for the preparation of a highly purified terephthalic acid obtained from a reaction liquid resulting from the oxidation of a para-alkylbenzene with molecular oxygen in the presence of a cobaltic compound, by preparing a suspension of said crude terephthalic acid in a fatty acid wherein at least 50% of said terephthalic acid is kept in a solid form at a temperature of 180 to 230° C. and contacting this suspension with a molecular oxygen-containing gas.

---

This invention relates to a process for preparation of high purity terephthalic acid.

Hitherto linear polyesters having fiber- and film-forming capabilities composed chiefly of polyalkylene terephthalates have been prepared by, first converting terephthalic acid to a dialkyl terephthalate and subjecting the same to ester interchange reaction with an alkylene glycol, instead of directly reacting terephthalic acid with an alkylene glycol. The reason why the simple direct esterification method has not been used is mainly that it is very difficult to purify terephthalic acid in the free acid form, while dialkyl terephthalates can be purified with relative ease by such conventional means as re-crystallization and distillation.

However, when this method is employed, terephthalic acid must first be esterified to dialkyl terephthalates with alkyl alcohols, and then subjected to the ester interchange reaction with alkylene glycols. This is essentially a circuitous method and it is apparent that it would be advantageous if highly polymerized polyalkylene terephthalates could be prepared by the direct esterification of terephthalic acid with alkylene glycols without any intermediate step.

For such polyalkylene terephthalate prepared by the direct esterification method to be water-white and commercially valuable when made into fiber or film, the material terephthalic acid must be refined and be of high purity.

Presently employed processes for purification of terephthalic acid on an industrial scale include an oxidation process with nitric acid or with air in which p-xylene is the starting material, and the Henkel process in which phthalic anhydride is the starting material.

Also, recently there was proposed a process for preparing terephthalic acid by oxidation of dialkyl benzenes, particularly p-xylene, with molecular oxygen in liquid medium under relatively mild conditions below 150° C., in the presence of a cobaltic compound while the reaction is under progress. As the liquid medium in the above process, generally, for example, aliphatic monocarboxylic acids of 2–4 carbons or their aqueous solutions are used. As the processes of the above type, there are those which perform the above reaction, for example, (a) in the presence of a methylene ketone such as methyl ethyl ketone (U.S. Patents Nos. 2,853,514 and 3,036,122), (b) using $O_3$ as the initiator, (c) adding an aldehyde such as acetoaldehyde (U.S. Patent No. 2,673,217), (d) adding an ether such as diisopropyl ether, and (e) as we proposed earlier, in the presence of a large amount of a cobalt salt. Terephthalic acid prepared by these methods often contains colored impurities and impurities capable of forming colored matters, and therefore are unsuited to produce water-white linear polyesters as by direct esterification.

For de-coloration of such crude terephthalic acid, a process of heating the crude terephthalic acid with acetic acid, propionic acid or butyric acid until it is dissolved, and then cooling the solution to crystallize the terephthalic acid has been known. However, so refined terephthalic acid at the best has an optical density no lower than 0.795.

Whereas, in order to obtain commercially valuable, water-white linear polyesters by a direct esterification method, the material terephthalic acid must have an optical density not more than 0.1 (cell length=5 cm.), preferably below 0.075 (cell length=5 cm.). Therefore with the above proposed process, the desired degree of purity of terephthalic acid cannot be obtained. There were also processed proposed in the past in which chemical reagents such as $KMnO_4$, $K_2Cr_2O_7$, $HNO_3$, and chlorine compounds are used as the oxidation agent, or a reducing agent is used. In such cases, however, besides the loss of such chemical reagents, there is such a deficiency that such a reagent or a reaction product therefrom produced during the refining operation tends to enter and remain in the terephthalic acid to degrade its quality, the removal of such impurity being difficult. Thus use of these reagents cannot be said to be preferable.

Again sufficiently refined terephthalic acid cannot be obtained when a crude terephthalic acid prepared by the oxidation reaction using molecular oxygen in the presence of a cobaltic compound as the catalyst is refined in the known manner as above described.

We noticed that the said production method of terephthalic acid by oxidation of p-dialkylbenzenes with molecular oxygen using a cobaltic compound as the catalyst (hereinafter this method is referred to as the "production method of terephthalic acid using a cobaltic compound") is of high interest, and carried out an extensive research on the process for refining so-produced crude terephthalic acid. As the result, we found that, for refining the crude terephthalic acid prepared by the production method of terephthalic acid using a cobaltic compound, it is advantageous to perform the refining oxidation thereof with molecular oxygen in an aliphatic monocarboxylic acid of 2–4 carbons, inclusive. Furthermore, we found that at that time the quantitative ratio of the aliphatic monocarboxylic acid or its aqueous solution used as the refining medium to the crude terephthalic acid and the temperature conditions of the refining are very closely related to the refining effectiveness.

This invention is based on such findings, and embraces a process for preparation of high purity terephthalic acid which comprises contacting with molecular oxygen-containing gas a suspension maintained at 180°–230° C. composed of 6–100 parts by weight of crude terephthalic acid separated from the reaction liquid resulted from oxidation of a p-dialkyl benzene with molecular oxygen in a liquid medium in presence of a cobaltic compound, and 100 parts by weight of at least one aliphatic monocarboxylic acid of 2–4 carbon atoms or an aqueous solution thereof of which water content is not more than 50%, preferably not more than 30% by weight, and then separating the terephthalic acid.

The aliphatic monocarboxylic acid having 2–4 carbon atoms which can be used in this invention is selected from the group consisting of acetic ($CH_3COOH$), propionic ($CH_3 \cdot CH_2 \cdot COOH$), n-butyric
$$(CH_3 \cdot CH_2 \cdot CH_2 \cdot COOH)$$
and iso-butyric

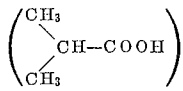

acids, which can be used singly or as a mixture.

This invention shall be further explained in detail hereinbelow.

STARTING MATERIAL

The refining process of this invention can be applied to any crude terephthalic acid or terephthalic acid-containing material as long as it is obtained by oxidation of a p-dialkyl benzene with molecular oxygen in a liquid medium in presence of a cobaltic compound, in any manner as described as (a) through (e) in the above.

As the liquid medium, mainly aliphatic monocarboxylic acids of 2–4 carbon atoms or their aqueous solutions have been used, but, in this invention, any liquid medium can be used as long as it does not interfere with the terephthalic acid-forming reaction.

For refining the terephthalic acid thus obtained, if the reaction liquid resulting from the oxidation is directly subjected to the subsequent refining step, i.e. without first separating the crude terephthalic acid, the refining effect is insufficient and the purpose of this invention cannot be achieved. Therefore, in accordance with this invention it is necessary to first separate the crude terephthalic acid from the reaction liquid and use the same as the starting material.

In a preferred embodiment, the separated crude terephthalic acid may be washed one to several times with a suitable solvent such as water or an aliphatic monocarboxylic acid of 2–4 carbon atoms or an aqueous solution thereof, and then used as the starting material in the present process.

REFINING MEDIUM

According to this invention, any of acetic, propionic, and n- and iso-butyric acids can be used as the refining medium as aforesaid, the particularly preferred being acetic acid. The medium usually consists of any one or a mixture of the above acids in substantially pure form, but may be in a form of an aqueous solution of which water content is not more than 50%, preferably not more than 30% by weight. When the water content is more than 50% based on the total weight, the refining effectiveness is lowered and the purpose of this invention cannot be achieved.

We made various studies on the relationship and as the result found that by contacting a suspension composed of 6–100 parts by weight of the crude terephthalic acid and 100 parts by weight of the refining medium (above-specified monocarboxylic acid or acids, or aqueous solution thereof of which water content is not more than 50%, preferably not more than 30% by weight) and which is maintained at 180°–230° C. with a gas containing molecular oxygen, very high purity terephthalic acid can be obtained.

(A) The significance of the quantitative ratio of the crude terephthalic acid to the refining medium to the refining effectiveness will be shown hereinafter based on empirical results. In the following examples and controls, parts and percents are all by weight.

Examples 1–7 and Controls 1–5

A stainless steel pressure reactor having a gas inlet at its lower part and which was equipped with a stirrer was charged with 20 parts of p-xylene, 130 parts of acetic acid and 20 parts of cobaltous acetate $$(Co(OCOCH_3)_2 4H_2O)$$

While maintaining the system at 120° C., air was passed into the reactor at the rate of 0.0095 mol/mol of p-xylene charged min., in terms of oxygen, at the pressure of 20 kg./cm.$^2$G with the stirring of 1200 r.p.m.

The reaction was continued until substantially no absorption of oxygen was observed, and thereafter the reaction mixture was taken out, with subsequent separation of liquid from solid by means of a centrifuge. The solid was washed with a small amount of glacial acetic acid, and further was mixed with three weight times of the solid of glacial acetic acid. The mixture was heated to boil for 20 minutes under reflux at atmospheric pressure, filtered while hot, and the solid was once more subjected to the above reflux treatment, hot-filtered, and washed. Thus obtained crude terephthalic acid was used as the starting material.

This crude terephthalic acid [optical density=0.480 cell length=5 cm.) Co content as  0.0192%] was put in a titanium pressure vessel together with refined glacial acetic acid at the ratios shown in Table 1, into which air was introduced raising the pressure to 12 kg./cm.$^2$G, and the mixture was stirred for 2 hours at 190° C.

Thereafter the mixture was quenched to 115° C. at the cooling rate of 26° C./min., and the content was taken out, filtered, washed with refined glacial acetic acid, boiled with distilled water, filtered, washed with distilled water, and dried. The refined terephthalic acid had optical densities (O.D.) as in Table 1 below.

TABLE 1

| Test No. | Example or Control No. | Crude Terephthalic Acid Charged (part) | Glacial Acetic Acid Charged (part) | Ratio of Un-dissolved Portion of Crude Terephthalic Acid Charged (percent) | Optical Density of Refined Terephthalic Acid |
|---|---|---|---|---|---|
| 1 | Control 1 | 2 | 100 | 40 | 0.150 |
| 2 | Control 2 | 3.3 | 100 | 64 | 0.121 |
| 3 | Control 3 | 5.3 | 100 | 78 | 0.103 |
| 4 | Example 1 | 6.6 | 100 | 82 | 0.092 |
| 5 | Example 2 | 10 | 100 | 88 | 0.082 |
| 6 | Example 3 | 11 | 100 | 89 | 0.088 |
| 7 | Example 4 | 20 | 100 | 94 | 0.057 |
| 8 | Example 5 | 25 | 100 | 95 | 0.060 |
| 9 | Example 6 | 33 | 100 | 96 | 0.070 |
| 10 | Example 7 | 43 | 100 | 97 | 0.078 |
| 11 | Example 8 | 54 | 100 | 98 | 0.082 |
| 12 | Example 9 | 67 | 100 | 98 | 0.085 |
| 13 | Example 10 | 82 | 100 | 99 | 0.098 |
| 14 | Control 4 | 122 | 100 | 99–100 | 0.161 |

REFINING CONDITIONS

As has been already pointed out, with respect to the starting material of the present process, the quantitative ratio between the refining medium and the crude terephthalic acid and temperature condition of the refining are very closely related to the refining effectiveness.

From the above Table 1, it can be understood that the quantitative ratio of the crude terephthalic acid to the refining medium (glacial acetic acid) greatly influences the degree of purity of the refined terephthalic acid. In the above table, less optical density indicates higher degree of purity of the refined terephthalic acid. In all of the experiments shown in Table 1 the refining having been carried out at 190° C., in case of Test Nos. 1–3 (Controls 1–3), the amount of the crude terephthalic acid used was less than 6 parts to 100 parts of glacial acetic acid (refining medium). And in Test Nos. 14 (Controls 4) the amount of the crude terephthalic acid used was more than 100 parts per 100 parts of glacial acetic acid. In all of these controls the resultant refined terephthalic acid had greater optical densities compared with refined terephthalic acid obtained under the conditions of Test Nos. 4–13 (Examples 1–10). The terephthalic acids refined under the conditions of Controls 1–4 had optical densities greater than 0.1 and therefore could not be used for direct esterification. In contrast, the terephthalic acids refined under the conditions of Examples 1–10 in accordance with this invention had optical densities less than 0.1, and could be used for direct esterification.

In Table 1 the percent ratios of the crude terephthalic acid remained undissolved in the refining medium (glacial acetic acid) are also given. The values indicate that under the conditions of this invention, the greater part of the crude terephthalic acid used as the starting material (approximately 80% or more) contact with molecular oxygen in non-dissolved state, and thereby terephthalic acid of higher purity can be obtained. This is indeed surprising.

Note that in this invention the measurement of the optical density was done with 25 cc. of 14% aqueous ammonia solution in which 1 g. of the sample was dissolved, at 380 m$\mu$ using a cell 5 cm. in length.

(B) We found that there is also a significant relationship between the temperature condition of the refining and the refining effectiveness. This is demonstrated hereinbelow with experimental data.

Examples 11–16 and Controls 5–10

A titanium pressure vessel was charged with 6.6 parts of the crude terephthalic acid prepared in the same manner as in Examples 1–10 (O.D=0.480, Co content as Co(OAc)$_2$4H$_2$O=0.0192%) and 100 parts of glacial acetic acid, and air was introduced thereinto raising the pressure to 12 kg./cm.$^2$G. The mixture was maintained at the temperatures given in Table 2 with stirring for 2 hours, and then was treated as in Examples 1–7. Thus refined terephthalic acid had the optical densities shown in Table 2 below.

fined at temperatures ranging from 180–230° C. as specified in this invention (Examples 11–16) had optical densities below 0.1, and could be used for direct esterification.

From the results of Controls 8 and 9, it can be also understood that at the refining temperatures above 250° C., the refined terephthalic acid had optical densities greater than that of the material crude terephthalic acid (0.480). Thus, when the refining is performed at above 250° C., the colored matter in the material crude terephthalic acid increases.

From the above, it should be understood that for refining crude terephthalic acid prepared by the process using a cobaltic compound as the catalyst, it is important to make the amount of the crude terephthalic acid 6–100 parts to 100 parts of refining medium and perform the refining operation at the temperature ranging from 180–230° C., as specified in this invention.

Under such conditions of this invention, at least 50% of the crude terephthalic acid to be refined retains its solid form in the refining medium, and therefore the refining operation is performed with the suspension of the crude terephthalic acid. For reference purpose, the solubility of terephthalic acid expressed in number of grams soluble in 100 g. of glacial acetic acid is as follows, at the indicated temperatures.

SOLUBLE AMOUNT (g.) OF TEREPHTHALIC ACID IN GLACIAL ACETIC ACID (100 g.)

| Soluble Amount of Terephthalic Acid (g.) | Temperature (° C.) | Soluble Amount of Terephthalic Acid (g.) | Temperature (° C.) |
| --- | --- | --- | --- |
| 0.10 | 108 | 3.74 | 242 |
| 0.20 | 125 | 4.17 | 245 |
| 0.24 | 133 | 4.58 | 248 |
| 0.40 | 153 | 5.49 | 256 |
| 0.55 | 160 | 6.85 | 264 |
| 0.80 | 177 | 7.73 | 270 |
| 1.21 | 194 | 8.63 | 276 |
| 1.29 | 197 | 9.64 | 280 |
| 1.63 | 205 | 10.59 | 285 |
| 2.04 | 215 | 11.49 | 289 |
| 2.45 | 225 | 12.56 | 292 |
| 2.86 | 230 | 13.64 | 296 |
| 3.26 | 236 | | |

OTHER CONDITIONS OF THIS INVENTION

Other conditions for practicing this invention will be further explained in detail hereinbelow.

TABLE 2

| Test No. | Example of Control No. | Refining Temperature (° C.) | Ratio of Undissolved Portion of Crude Terephthalic Acid (percent) | Optical Density of Refined Terephthalic Acid |
| --- | --- | --- | --- | --- |
| 15 | Control 5 | 160 | 91.0 | 0.192 |
| 16 | Control 6 | 175 | 84.0 | 0.128 |
| 17 | Example 11 | 180 | 83.4 | 0.096 |
| 18 | Example 12 | 190 | 82.0 | 0.090 |
| 19 | Example 13 | 200 | 77.4 | 0.077 |
| 20 | Example 14 | 210 | 74.3 | 0.050 |
| 21 | Example 15 | 220 | 60.5 | 0.070 |
| 22 | Example 16 | 230 | 54.5 | 0.098 |
| 23 | Control 7 | 235 | 50.0 | 0.155 |
| 24 | Control 8 | 250 | 28.8 | 0.519 |
| 25 | Control 9 | 261 | 9.1 | 1.231 |

In the above Examples 11–16 and Controls 5–9, the quantitative ratio of the crude terephthalic acid to glacial acetic acid (refining medium) was made constant (6.6:100—this is same to the ratio employed in Example 1) within the scope of this invention, and the temperature condition only was varied to examine the relationship between the temperature condition with the refining effectiveness.

From the results shown in Table 2 it is recognized that even when the quantitative ratio of the crude terephthalic acid charged to the refining medium was within the range specified in this invention (6–100 parts of the former per 100 parts of the latter), if the temperature employed at the time of the refining was below 180° C. (Controls 5 and 6) or above 230° C. (Controls 7, 8 and 9), in all cases the resultant refined terephthalic acid had optical densities greater than 0.1 and could not be used for direct esterification. In contrast, the terephthalic acid re- The molecular oxygen-containing gas used to refine the crude terephthalic acid in this invention may be substantially pure oxygen, or may be molecular oxygen-containing gas containing also other inert gases such as nitrogen and carbon dioxide. The molecular oxygen content is not critical. Generally air is one example of the least expensive molecular oxygen-containing gases. The partial pressure of molecular oxygen in the system is not critical, generally 1–50, particularly 1–10, atmospheres being preferred.

The total pressure in the reactor is the sum of the vapor pressure of the solvent, oxygen pressure and the partial pressure of the inert gas or gases present. This invention is operable at any pressure as long as it permits at least a portion of the refining medium in the reaction system to maintain the liquid phase, but the generally preferred range is 5–100 atmospheres as total pressure.

Again the oxidation refining of this invention is operable both in the presence and absence of a catalyst. Any known catalyst for liquid phase air oxidation can be used. Generally, valency variable metals such as Co, Mn, Ni, Cr and Pb, or their compounds are employed.

However, in this invention a cobaltic compound being used as the catalyst for liquid phase air oxidation of p-dialkyl benzenes, in most cases the cobalt catalyst remaining in the crude terephthalic acid is sufficient for the purpose.

As to the time required for the refining, usually 5 minutes to 5 hours, particularly 30 minutes to 3 hours, is suitable, as the time during which the system is maintained at temperatures within the range specified in this invention.

The obtained treated liquid is cooled suitably to a temperature below the treating temperature—generally below the boiling point of the refining medium used but above the melting point thereof. When a relatively high temperature close to the boiling point of the refining medium is applied, particularly good refining effect can be obtained. The rate of cooling is not critical—the reaction liquid may be quenched or cooled gradually. In many cases, however, gradual cooling may be preferred. The terephthalic acid precipitated from the suspension upon cooling is separated in any known manner such as filtration and centrifuge. The separated product may optionally be further washed and dried to provide the object refined terephthalic acid. Again, it may form a slurry with water or ethylene glycol without drying, and is sent to the subsequent processing step.

This invention can be practiced both batch-wise and continuously. Also the refining in accordance with this invention may be repeated.

Still some other embodiments of this invention will be described hereinafter.

The following examples, Nos. 17, 18 and 19, each show an example wherein the method of preparing the material crude terephthalic acid was different from that in the foregoing Examples 1–16, and wherein a different refining medium from that of Examples 1–16 was used.

Example 17

A stainless steel pressure reactor having a gas inlet at its lower part and which was equipped with a stirrer was charged with 20 parts of p-xylene, 130 parts of acetic acid, 4.72 parts of cobaltous acetate ($Co(OAc)_2 \cdot 4H_2O$) and 13.6 parts of methyl ethyl ketone. While maintaining the system at 120° C., air was passed into the reactor at the rate of 0.01 mol/mol of p-xylene min. in terms of oxygen, at the pressure of 20 kg./cm.$^2$G with the stirring of 1200 r.p.m. The reaction was continued until substantially no absorption of oxygen was observed, and thereafter the reaction mixture was taken out, followed by separation of liquid from solid by means of centrifuge. The solid was washed with a small amount of glacial acetic acid, and further was mixed with four weight times of the solid of glacial acetic acid. The mixture was heated to boil at atmospheric pressure for 30 minutes under reflux, hot-filtered, and the remaining solid was once more subjected to the above reflux treatment, hot-filtered and washed.

20 parts of the obtained crude terephthalic acid (O.D.=0.330 Co content as $Co(OAc)_2 \cdot 4H_2O$=0.0156%) and 100 parts of glacial acetic acid were charged in a titanium pressure vessel, into which air was introduced raising the pressure to 10 kg./cm.$^2$G. The whole system was maintained at 210° C. and stirred for an hour. Then the content was quenched to 115° C. and taken out of the vessel, filtered, washed with refined glacial acetic acid, boiled with distilled water, filtered, washed with distilled water and dried. The obtained refined terephthalic acid had an optical density of 0.038.

Example 18

Crude terephthalic acid was prepared in the manner described in Examples 1–10, except that propionic acid was used in place of acetic acid. The resultant crude terephthalic acid having an optical density of 0.510 and a Co content as $Co(OAc)_2 \cdot 4H_2O$ of 0.0212% was refined in the manner described in Example 17. The refined terephthalic acid had an optical density of 0.059.

Example 19

A stainless steel pressure reactor was charged with the same reaction system as in Example 1, through which $O_3$ was passed for 30 minutes and then air was passed as in Example 1, the subsequent treatments being the same as those in Example 1. Thus obtained crude terephthalic acid (O.D.=0.464, Co content as $Co(OAc)_2 \cdot 4H_2O$= 0.020%) was treated in the like manner as in Example 17. The resulting refined terephthalic acid had an optical density of 0.049.

Example 20

Example 17 was repeated except that 30 parts of acetaldehyde was used in place of methyl ethyl ketone, and the temperature employed was 50–60° C. for the first two hours and thereafter 115° C. The resulting crude terephthalic acid (O.D.=0.681, Co content as $Co(OAc)_2 \cdot 4H_2O$=0.0276%) was treated as in Example 17. So refined terephthalic acid had an optical density of 0.063.

Examples 21–23

The crude terephthalic acid used in Examples 1–10 was refined under the same conditions as in Example 17, using the following solvents. The results were as shown below.

| | Solvent | Optical Density of Refined Terephthalic Acid |
|---|---|---|
| 21 | Water (15%)/acetic acid (85%) | 0.054 |
| 22 | Propionic acid | 0.067 |
| 23 | Butyric acid | 0.069 |

Some controls will be given hereafter, all being performed under conditions outside the present invention. In Control 10 the material crude terephthalic acid was prepared by so-called Henkel process, and in Control 11, by so-called SD process described in U.S. Patent No. 2,833,816. In Control 12 although the method of preparation of the crude terephthalic acid was within the scope of this invention, the acid was not first separated from the reaction liquid. It can be understood that in each case, terephthalic acid was not refined to the satisfactory purity.

Control 10

An autoclave was charged with substantially anhydrous dipotassium phthalate (100 parts) and $CdCl_2$ (3 mol percent to the dipotassium phthalate), and was maintained at 435° C. in $CO_2$ atmosphere at the pressure of 5 kg./cm.$^2$G for an hour. Thereafter the autoclave was air-cooled, and the content was dissolved in water to form a 10–15% solution, from which carbonaceous matters were removed by filtration. To the filtrate activated carbon was added at about 60° C. and the mixture was let stand, filtered, and added with hydrochloric acid to precipitate terephthalic acid (O.D.=1.71). The refined terephthalic acid obtained by treating the above crude terephthalic acid as in Example 17 had an optical density of 0.441 and was colored reddish brown.

Control 11

A titanium pressure reactor having a gas inlet at its lower part and which was equipped with a stirrer was charged with 40 parts of p-xylene, 120 parts of acetic acid and 2.0 parts of manganous bromide ($MnBr_2 \cdot 4H_2O$). While maintaining the system at 190° C., air was passed into the reactor at the rate of 0.1 mol/mol p-xylene min. in terms of oxygen, at 30 kg./cm.$^2$G with the stirring of 1200 r.p.m. The reaction was continued until substantially no absorption of oxygen was observed, and thereafter the reaction mixture was taken out, followed by separation of liquid from solid by means of centrifuge. The solid was washed with a small amount of glacial acetic acid, and further was mixed with four weight times thereof of glacial acetic acid. The mixture was heated to boil under reflux at atmospheric pressure for 20 minutes, hot-filtered, and the remaining solid was washed.

Thus obtained crude terephthalic acid (O.D.=0.71, Mn content as $Mn(OAc)_2 \cdot 4H_2O = 0.0282\%$) was treated as in Example 14. The resulting refined terephthalic acid had an optical density of 0.545 and was yellow-tinted.

Control 12

The reaction mixture obtained by oxidation of p-xylene under the same conditions as in Example 1 was left in the reactor as it was, and the inside pressure of the reactor was raised to 13 kg./cm.$^2$G (partial pressure of air=12 kg./cm.$^2$G, partial pressure of acetic acid=1 kg./cm.$^2$G). The reaction mixture was then stirred for an hour at the elevated temperature of 210° C., and thereafter cooled to 110° C. The content was taken out and filtered. The obtained crude terephthalic acid was washed with refined glacial acetic acid, boiled with distilled water, filtered, again washed with distilled water and dried. The resultant terephthalic acid had an optical density of 0.287, and was colored yellow.

We claim:

1. A process for preparation of high purity terephthalic acid which comprises contacting with molecular oxygen-containing gas, a suspension maintained at 180–230° C. composed of 6–100 parts by weight of crude terephthalic acid separated from the reaction liquid resultant from the oxidation of a para-dialkyl benzene with molecular oxygen in a liquid medium in the presence of a cobaltic compound, and 100 parts by weight of at least one aliphatic monocarboxylic acid of 2–4 carbon atoms the water content of said suspension being not more than 50 weight percent, wherein at least 50% of the crude terephthalic acid retains its solid form in the suspension, and separating the terephthalic acid.

2. The process of claim 1 in which the water content of the solution of aliphatic monocarboxylic acid of 2–4 carbon atoms is not more than 30% by weight.

3. The process of claim 1 in which the para-dialkyl benzene is para-xylene.

4. The process of claim 1 in which the aliphatic monocarboxylic acid of 2–4 carbon atoms is at least one selected from the group consisting of acetic, propionic, and n- and iso-butyric acids.

5. The process of claim 1 in which the aliphatic monocarboxylic acid of 2–4 carbon atoms is acetic acid.

6. The process of claim 1 in which the liquid medium is at least one aliphatic monocarboxylic acid of 2–4 carbon atoms.

7. The process of claim 1 in which the liquid medium is an aqueous solution of at least one aliphatic monocarboxylic acid of 2–4 carbon atoms.

References Cited

UNITED STATES PATENTS

| 2,865,708 | 12/1958 | Dinsmore et al. | 260—525 XR |
| 2,899,466 | 8/1959 | O'Neill | 260—525 |
| 2,923,736 | 2/1960 | Maclean | 260—525 |
| 3,364,256 | 1/1968 | Ichikawa et al. | 260—525 |

FOREIGN PATENTS

| 666,709 | 2/1952 | Great Britain. |
| 785,051 | 10/1957 | Great Britain. |
| 774,835 | 5/1957 | Great Britain. |
| 908,736 | 10/1962 | Great Britain. |

LORRAINE A. WEINBERGER, *Primary Examiner.*

D. STENZEL, *Assistant Examiner.*

U.S. Cl. X.R.

260—524